| United States Patent [19] | [11] B 3,988,272 |
|---|---|
| Watts et al. | [45] Oct. 26, 1976 |

[54] PRODUCTION OF THERMOSET WATER-IN-OIL EMULSIONS

[75] Inventors: Golden F. Watts, Rosemount; Carlton E. Coats, Burnsville, both of Minn.

[73] Assignee: Ashland Oil, Inc., Ashland, Ky.

[22] Filed: Jan. 24, 1973

[21] Appl. No.: 326,211

[44] Published under the second Trial Voluntary Protest Program on March 23, 1976 as document No. B 326,211.

Related U.S. Application Data

[63] Continuation of Ser. No. 135,684, April 20, 1971, abandoned, which is a continuation-in-part of Ser. No. 110,855, Jan. 29, 1971, abandoned.

[52] U.S. Cl. .................... 260/22 CB; 260/29.6 NR; 260/29.6 MM; 260/29.6 MN; 260/29.7 NR; 260/29.7 N; 260/864; 260/868

[51] Int. Cl.² ........................................ C08L 67/06

[58] Field of Search ............... 260/29.6 NR, 29.6 R, 260/29.6 MM, 29.6 MN, 864, 22 CB

[56] References Cited
UNITED STATES PATENTS

| 3,236,915 | 2/1966 | Zanaboni ........................... 260/864 |
|---|---|---|
| 3,256,219 | 6/1966 | Will ............................ 260/29.6 NR |
| 3,367,994 | 2/1968 | Parker et al. ....................... 260/864 |
| 3,442,842 | 5/1969 | von Bonin .................. 260/29.6 NR |
| 3,629,129 | 12/1971 | Bedighian ....................... 260/22 CB |

*Primary Examiner*—Harold D. Anderson

[57] ABSTRACT

Water-in-oil emulsions containing ethylenically unsaturated compound(s) are converted to thermoset form by polymerization of said compound(s) with N-hydroxyalkyl substituted, phenyl-substituted tertiary amine compound(s), oil soluble cobalt salt(s) and peroxy free radical catalyst(s).

24 Claims, 1 Drawing Figure

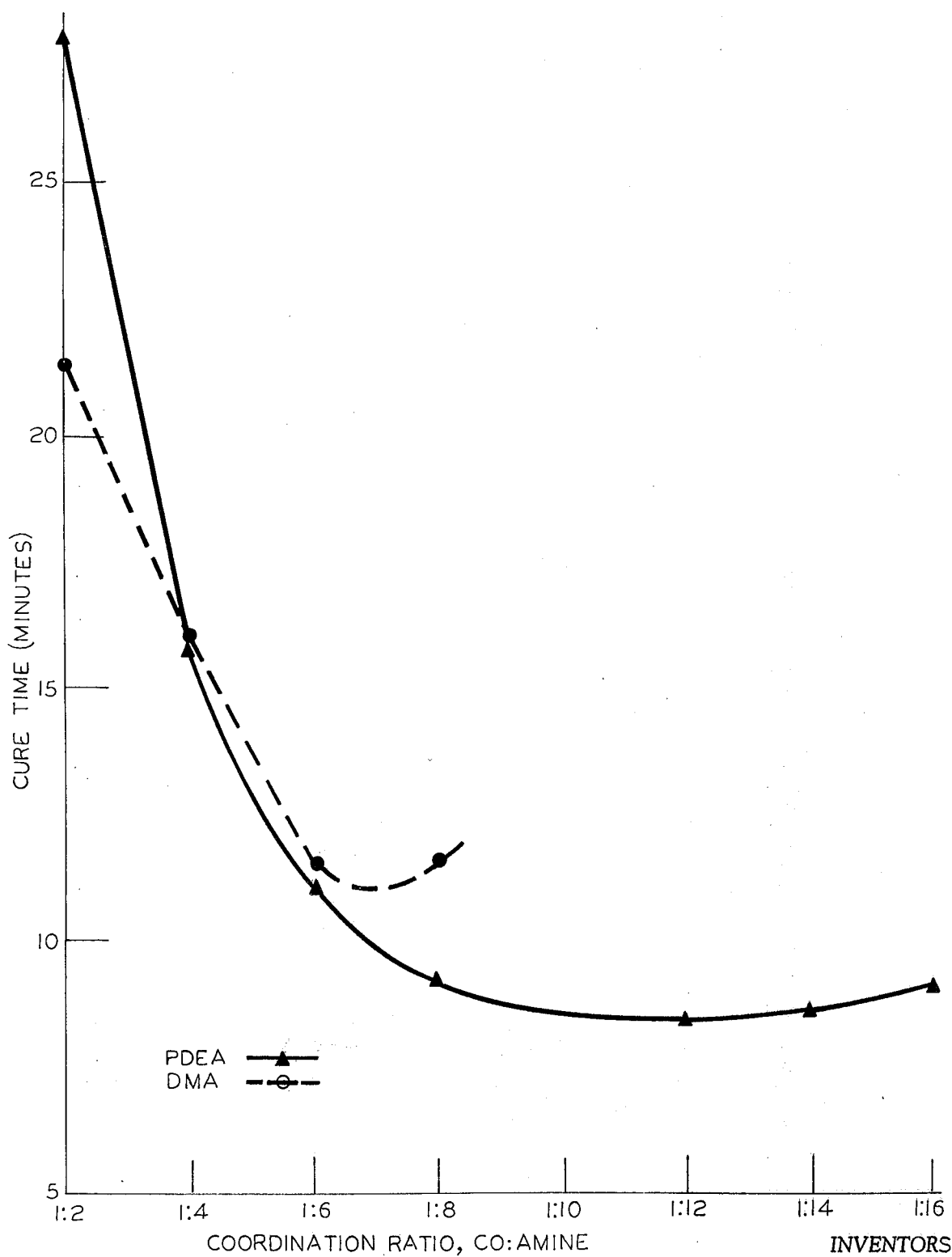

PRODUCTION OF THERMOSET WATER-IN-OIL EMULSIONS

RELATED APPLICATION

This is a continuation of application Ser. No. 135,684 filed Apr. 20, 1971 and now abandoned, which in turn is a continuation-in-part of our prior copending application of the same title, filed Jan. 29, 1971, Ser. No. 110,855 and now abandoned.

BACKGROUND

Free radical-induced polymerization has heretofore been catalyzed by carrying out the polymerization in the presence of decomposing peroxy compounds which serve as free radical generators. It is known that the presence of cobalt ions will promote the breakdown (and therefore the catalytic activity) of the peroxy catalysts. When the cobalt ions are coordinated or complexed with certain amines, the rate of decomposition of the peroxy compound can be enhanced still further.

The amines in question are tertiary amines which include phenyl substitution connected to the amino nitrogen. Because of their structure, these amines apparently hold the unshared pair of electrons on the nitrogen atom of the amine sufficiently loosely for making said electrons available for coordinating with cobalt and/or for entering into free radical reactions. Such tertiary amines have been used in conjunction with peroxy catalysts and cobalt ions in the crosslinking of unsaturated polyester resins with ethylenically unsaturated solvents such as styrene under essentially anhydrous conditions.

Specific examples of such amines which have been used for quite a few years are the phenyl dialkyl tertiary amines having 1–6 carbon atoms in their alkyl groups, such as dimethyl aniline (DMA) and diethyl aniline (DEA). More recently, phenyl alkyl hydroxyalkyl and phenyl dihydroxyalkyl tertiary amines having 1–6 carbon atoms in their alkyl and hydroxyalkyl groups have been suggested for use in anhydrous systems. It has been claimed that in anhydrous systems the last mentioned amines, exemplified by phenyl diethanolamine and by phenyl ethyl ethanol amine, are faster acting than the phenyl dialkyl tertiary amines.

Water-in-oil emulsions, the oil phases of which contain polymerizeable material, may be used to form useful objects if the polymerizeable material is polymerized without breaking the emulsion while the latter is maintained in contact with a suitable shaping member. See U.S. Pat. No. 3,256,219 to Guenther Will, the disclosure of which is incorporated by reference. The polymerizeable portions of such emulsions undergo free-radical induced polymerization, and they have been catalyzed successfully with combinations of peroxy catalysts, cobalt ions and phenyl dialkyl amines such as DMA, notwithstanding the large amounts of water present in such emulsions (e.g., at least 25% by weight on the emulsion). However, attempts to apply the above-mentioned hydroxyalkyl substituted tertiary amines initially proved unsucessful. The results indicated that the last-mentioned amines offered no advantage over the phenyl dialkyl tertiary amines and were inferior thereto in overall cure time. However, the present invention has provided a way of employing the phenyl alkyl hydroxyalkyl and phenyl dihydroxyalkyl tertiary amines in a way which provides in aqueous systems overall cure times at least as fast if not faster than those obtained with the same number of coordination equivalents of phenyl dialkyl tertiary amines, as well as faster gel times, thus surpassing the rate of production which, in the absence of the invention, might otherwise be attained with a given number of shaping members.

BRIEF DESCRIPTION OF THE INVENTION

The method of the present invention pertains to the art of curing polymerizable water-in-oil emulsions in which at least a major weight portion of the oil phase is one or more ethylenically unsaturated compounds susceptible to free radical induced polymerization. In accordance with the invention, such an emulsion is converted to thermoset form with peroxy catalyst, cobalt ions and at least 4 coordination equivalents per mole of cobalt of at least one amine compound having at least one hydroxyalkyl group connected to the amino nitrogen as in the following formula:

(A) 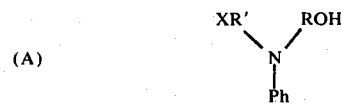

wherein X is a hydroxyl group or hydrogen, and R and R' are identical or different divalent saturated aliphatic hydrocarbon groups having 1–6 carbon atoms and Ph is phenyl. Altogether, the weight of said amine(s), cobalt (as metal), and peroxy catalyst(s) is 0.25–10% and preferably 0.5 to 3% by weight, based on the polymerizeable ingredients of the emulsion.

DISCUSSION

Water-in-oil emulsions have an aqueous phase, which is water or an aqueous solution, and an oil phase which is basically one or more liquid organic compounds that are immiscible with the aqueous phase. In such emulsions, a multitude of tiny droplets of aqueous phase are distrubuted uniformly throughout the oil phase, which surrounds them. Accordingly, the oil and aqueous phases are referred to as the continuous and discontinuous phases, respectively.

In order to provide the requisite degree of stability, the droplets of aqueous phase should have a diameter less then 50 microns and preferably predominately less than 10 microns. Emulsions of the type used in the present invention have sufficient stability to resist breaking on polymerization of the polymerizable portion of the oil phase, at least until such time as the emulsion has sufficiently solidified to prevent major redistribution of the water. Thus, the water-in-oil emulsions employed in the present invention are to be distinguished from conditionally stable mechanical dispersions in which the water droplets for the most part coalesce into large drops prior to or during polymerization. For further information on the applicable water-in-oil emulsions, reference is made to U.S. Pat. No. 3,256,219 to Guenther Will.

Both polymerizable and nonpolymerizable materials may be present in the oil phase. By way of example and non limitation, it may be mentioned that the oil phase can include nonpolymerizable plasticizers for softening the resinous matrix of the finished thermoset emulsion, polymeric and nonpolymeric emulsifiers for assisting in the formation and/or retention of the emulsion, and organic dyestuffs. However, at least the major portion of the oil phase on a weight basis is one or more ethylenically unsaturated compound(s). Embraced within the meaning of the term "compound" are low molecular weight compounds such as monomers, as well as medium and high molecular compounds such as prepolymers and polymers. The ethylenically unsaturated compounds may be used alone or in any desired interpolymerizable combination. However, the thermoset emulsions which presently appear to be of most significant commercial interest are those prepared from water-in-oil emulsions in which the oil phase is composed entirely, or at least to the extent of about 50% by weight, of a mixture of unsaturated polyester resin and styrene. It should be understood also that the ethylenically unsaturated compounds, whether of low or high molecular weight, are not limited in respect to the number of ethylenically unsaturated groups which they may contain. By selecting ethylenically unsaturated compounds and mixtures thereof having differing degrees of unsaturation, it is possible to vary the rigidity, heat distortion temperature, flexibility and other properties of the final product, and those skilled in the art are well educated in the criteria for making such selections.

The emulsion is converted to thermoset form, without breaking same, by polymerizing the ethylenically unsaturated compound(s) in the oil phase, thus transforming the latter to solid form. This process is referred to as "curing". In curing of emulsions, various stages may be observed. There is normally an initial period during which the emulsion, though beginning to polymerize, is still "mobile"; that is, it may be stirred. Gellation follows; that is, the emulsion becomes immobile. This change often occurs abruptly, sometimes gradually. Stirring and pouring are no longer possible after gellation. However, the physical properties of the gelled material, expecially tensile strength and dimensional stability, normally fall far short of the ultimate capabilities of the raw materials. These properties develop further during a continuation of the polymerization subsequent to gellation marked by a rising temperature in the emulsion due to the exothermic nature of the polymerization. After the temperature reaches a maximum, referred to as "peak exotherm", and the thermoset emulsion has cooled, physical testing normally discloses tensile and dimensional properties far exceeding those of the gelled material.

When the emulsions are employed in making shaped objects as is often the case, the polymerization normally takes place with the emulsion in contact with a shaping member, e.g., a quantity of emulsion is polymerized in a mold. Production capacity with a given number of molds is influenced by the time consumed in the polymerization, and various terms are employed to identify the elapsed time in the various stages of polymerization mentioned above. Thus, "gel time" or GT, refers to the time elapsed between commencement of polymerization and gellation of the emulsion. The instant when gellation has occurred normally can readily be determined manually by repeatedly and gently dipping a probe, e.g., a stirrer or tongue depressor, into the polymerizing emulsion. When the emulsion resists penetration by the probe, it has gelled. When the gellation occurs gradually, commercially available gel time measuring devices may prove useful. The elapsed time from the moment of gellation to peak exotherm is referred to as "gel to peak exotherm" or GPE. The "total cure time" or CT is the sum of the GT and GPE.

Phenyl-substituted amines which contain substituted phenyl groups which permit unshared electrons on the amino nitrogen to coordinate or react in the above-described manner are considered to be the equivalent of those amines which have an unsubstituted phenyl group. Indeed, substitution in the phenyl group may enhance the activity of the amine, as in the case of a methyl group located meta to the carbon atom of the N-phenyl bond. By way of example and not limitation, other groups such as alkoxy (e.g., methoxy) and halogen (e.g., chloro and fluoro) are also useful substituents for inclusion in the phenyl group. Thus, for purposes of the present specification and claims, the term phenyl should be interpreted as including substituted phenyl.

Although there is no intention of being bound by such theory, experimentation suggests that the hydroxyalkyl substituted amines coordinate(s) with cobalt at the amino nitrogen and at their hydroxyl group(s). It is thus preferred that in the compound of formula A, the group X should be —OH. Thus, depending on whether X is —OH or not, the compound A may have three or two coordination sites, respectively. For purposes of the present invention, the coordination equivalent weight of the amine compounds is determined by dividing their molecular weight by the number of coordination sites referred to in the foregoing discussion. The number of coordination equivalents of amines is obtained by separately dividing the weight of each amine by its coordination equivalent weight and summing the quotients. Experts in the field of free radical catalysts and promotors have generally credited Co with less then 4 effective coordination sites, but six coordination sites are assumed for purposes of the present invention. Thus, the number of coordination equivalents of cobalt is obtained by dividing the weight of cobalt (as metal) by one sixth the atomic weight thereof, e.g., about 10.

The groups R and R' in formula A may have from one to six carbon atoms. The preferred range is one to four carbon atoms, with two being most preferred, e.g., as in phenyl-diethanolamine, phenyl-ethylethanolamine and m-tolyl-diethanolamine. Other hydroxyalkyl amines falling within the general formula A are:

N-methyl-N-hydroxyethyl-m-methylaniline
N-ethyl-N-hydroxyethyl-m-methylaniline
N-propyl-N-hydroxyethyl-m-methylaniline
N-butyl-N-hydroxyethyl-m-methylaniline N-hexyl-N-hydroxyethyl-m-methylaniline  N-ethyl-N-hydroxyethyl-o-methylaniline
N-ethyl-N-hydroxyethyl-p-methylaniline
N-ethyl-N-hydroxyhexyl-m-ethylaniline
N-propyl-N-hydroxyethyl-o-ethylaniline
N-butyl-N-hydroxyethyl-p-ethylaniline
N-methyl-N-hydroxypropyl-m-ethylaniline
N-butyl-N-hydroxybutyl-m-butylaniline
N-propyl-N-hydroxybutyl-p-butylaniline Further information on such amines and their use in essentially nonaqueous systems may be found in U.S. Pat. No. 3,367,994 and Kodak Eastman Chemicals Technical Data Publication TDS No. D-129.

Cobalt ions dissolved in the oil phase cooperate with the aforesaid amines in promoting the peroxy catalysts described hereinafter. The ions are most conveniently made available to the site of polymerization in the form of oil soluble organic salts of carboxylic acids. As the literature (Oleesky and Mohr, SPI Handbook of Reinforced Plastics, Reinhold, 1964, p. 48) teaches that one type of salt (e.g. cobalt linoleate) exhibits no advantage as a promoter over another type of salt (e.g., cobalt naphthenate), the identity of the organic moiety is not deemed critical. Examples of suitable cobalt salts are those mentioned above, as well as the neodecanate, tallate, stearate and octoate, the neodecanate and octoate being preferred on account of their relatively high weight percent of metal content as compared to salts of higher acids, e.g., those of up to 24 carbon atoms.

The peroxy catalysts to be employed in the present invention are well known to those skilled in the art. They include organic or inorganic peroxide or hydroperoxide catalysts or mixtures thereof. Some representative catalysts include hydrogen peroxide, methylethylketone peroxide, 2,4 pentane dione peroxide or combinations of it with ditert-butyl peroxide, cyclohexanone peroxide, polymeric ketone peroxides, lauroyl peroxide, cumene hydroperoxide, di-cumyl peroxide, diethyl peroxide, di-tert-amyl peroxide, cyclohexyl hydroperoxide and mixtures of any of the peroxy catalysts. The preferred catalysts are hydrogen peroxide, methylethylketone peroxide, and cyclohexyl peroxide.

The ethylenically unsaturated polyester employed in the preferred oil phase of the present invention can be produced by reacting a polycarboxylic acid and a polyhydric alcohol (or the anhydride of either or both of the foregoing) at the esterification temperatures, generally at least 150°C, until the acid value and the hydroxyl value of the reaction mixture has been reduced to values corresponding to a mean weight average molecular weight in the range of about 1000 to about 10,000. The polyesters useful in the present invention can be random polyesters produced by simultaneous addition of total quantities of all reactants or block polyesters produced by sequential addition of one or more reactants such as the saturated and unsaturated polycarboxylic acids. The polyester can be one or more $\alpha,\beta$-ethylenically unsaturated polyester of an $\alpha,\beta$-ethylenically unsaturated polycarboxylic acid and/or anhydride thereof, and polyhydric alcohol and/or alkylene oxide.

The polyhydric alcohols which can be reacted with the polycarboxylic acids in order to give polyesters useful in the present invention are preferably the dihydric alcohols, examples of which include, among others, ethylene glycol, diethylene glycol, 1,2-propylene glycol, 1,2- or 1,3-dipropylene glycol, 1,3-propylene glycol, 1,3-butylene glycol, 1,2-butylene glycol, neopentyl glycol, 1,3-pentanediol, and 1,5-pentanediol. Higher polyhydric alcohols such as trimethylol propane and pentaery-thritol can be used in minor amounts of up to 5% by weight.

The polycarboxylic acid which can be employed to produce the unsaturated polyesters useful in the present invention generally have 3 to 36 and preferably 4 to 8 carbon atoms. Unsaturated acids are used to impart the desired unsaturation to the polyesters, but "saturated" acids (including acids with unreactive unsaturated bonds) are used to vary the degree of unsaturation and therefore the crosslinking density of the polyesters in a manner known to those skilled in the art. Examples of suitable unsaturated acids include aliphatic acids such as fumaric acid, maleic acid, itaconic acid and their anhydrides. Suitable saturated acids include, among others, oxalic acid, malonic acid, adipic acid, succinic acid, glutaric acid, sebacic, azelaic acid and dimers of $C_{12}$ and $C_{18}$ acids. Phthalic, isophthalic and terephthalic acids behave like saturated acids and are preferred saturated acids in accordance with the invention because they can impart desirable physical characteristics such as compressive and tensile strength and impact resistance to the cured emulsion. Halogenated acids such as tetrachlorophthalic acid, tetrabromophthalic acid, and chloroendic acid (1,4,5,6,7,7-hexachloro-5-norbornene-2,3-dicarboxylic acid) can also be employed. Higher polycarboxylic acids such as trimellitic anhydride may be employed in small amounts, e.g., up to 5% by weight in combination with dicarboxylic acids. Saturated monobasic acids may also be present in the polyesters, such as for capping purposes. Thus, for example, benzoic acid, 2-ethyl hexoic and up to $C_{24}$ saturated fatty acids may be included. However, in a preferred embodiment, the polyesters consist essentially of dicarboxylic acids as the major weight portion of the total acid components.

The relative proportions of unsaturated and saturated acids are such as to provide the resultant polyester with ethylenic unsaturation capable of reacting with a copolymerizable solvent. It is necessary that the unsaturation of the polyester be alpha, beta-ethylenic unsaturation. Generally the molar ratio of unsaturated acid to saturated acid is from 1:0 to 1:5. The molar ratio of polycarboxylic acid to polyhydric alcohol is generally from 10:8 to 8:10, although stoichiometric ratios or those having up to 10 to 20 mole % excess polyhydric alcohol can also be employed.

Solvents which are useful in forming the oil phase of the water-in-oil emulsions used in the present invention are those which are copolymerizable with the ethylenically unsaturated polyester and which will dissolve the polyester. Examples of these solvents include vinyl toluene, alpha-methyl styrene, acrylonitrile, ethylacrylate, methylacrylate, methylmethacrylate, vinylacetate, triallyl cyanurate, diallyphthalate, methylvinylether, and ethylvinylether. Styrene is the preferred solvent because of its cost, availability and reactivity. For purposes of the present specification and claims, "styrene" includes any of the styrenes and mixtures of ethylenically unsaturated monomers in which one or more styrenes represent the major weight portion of such mixtures. The copolymerizable solvent is employed with the unsaturated polyester in weight ratios of about 10:1 to about 1:10 and preferably about 1:2 to about 2:1.

The discontinuous aqueous phase can be water per se or it can contain up to 75% or preferably up to 25% by weight of other additives which are soluble in the water. Examples of such additives are alcohols, in particular lower monohydric aliphatic alcohols such as methanol, ethanol, and n- and iso-propanol, and n-, iso, and tertiary butanol; lower ethers and lower ketones such as methylethylether and dimethyl ketone; inorganic salts such as sodium chloride, potassium sulfate, sodium sulfate, magnesium sulfate and magnesium chorlide. In addition the aqueous dispersed phase can contain various organic liquids with a high dielectric constant such as formamide and diemthylformamide, or carbohydrates such as saccharose, glucose, and fructose. Generally, the weight ratio of aqueous phase to oil phase is in the range of about 1:3 to 9:1 and preferably about 4:6 to about 7:3.

EXAMPLES

In the following examples which are given to illustrate rather than restrict the invention, all parts and percentages are by weight except as indicated.

A quantity of resin solution is formed from 65 parts of styrene, 21 parts of polyester of maleic acid, isophthalic acid and propylene glycol in a molar ratio of 1:1:2, having acid and hydroxyl values of 8–12 and 15–30 respectively; and 14 parts of polyester of maleic acid, adipic acid and diethylene glycol in a molar ratio of 1:3:4, having acid and hydroxyl values of 8–12 and 10–25 respectively. Each of the foregoing resins is inhibited with 100 ppm of tertiary butyl catechal.

To a batch of resin solution are added (while agitation continues) predetermined quantities of cobalt neodecanate, dimethyl aniline (DMA) and phenyl diethanol amine (PDEA). The cobalt neodecanate is added in the form of a liquid preparation containing 12% cobalt as metal. The DMA is added in the form of liquid (100% purity) and the PDEA is added in the form of a 50% solution in Solox solvent.

Into the vortex formed in the solution by the rapidly turning agitation is gradually poured 100 parts of water to form a water-in-oil emulsion. The agitated emulsion is catalyzed by adding a predetermined quantity of a 35% aqueous solution of hydrogen peroxide. The gellation of the batch is timed from the moment of addition of the catalyst. Gellation is judged to have occurred when the emulsion resists penetration by a tongue depressor. Gel to peak exotherm is measured with a thermocouple and moving chart recorder. The thermocouple is inserted in the batch prior to gellation and the chart is manually marked or started at the instant of gellation so that the GPE time from gellation to peak recorded temperature may be determined. The percentages of catalyst solution and cobalt weight preparation, the weight of PDEA or DMA, the ratio of moles of cobalt to coordination equivalents of PDEA or DMA, as well as the gel time, gel to peak exotherm time and peak exotherm for each batch are shown in the following table:

ity of the invention fully demonstrated at coordination levels up to 16. Within the preferred range of coordination ratios, e.g., about 1:6 and to about 1:10, moles of cobalt to coordination equivalents of amines, the emulsions are gelled in a minute or less at room temperature (e.g., about 20°–30°C) without application of external heat when using the hydroxyalkyl substituted amine. The faster gellation and curing thus obtained facilitate rapid mass production of molded parts by permitting a shorter molding cycle.

What is claimed is:

1. A method of curing polymerizable water-in-oil emulsions in which at least a major weight portion of the oil phase is one or more α, β-ethylenically unsaturated polyester resin of a member selected from the group consisting of α,β-ethylenically unsaturated polycarboxylic acid, anhydrides thereof, and mixtures thereof; and a member selected from the group consisting of polyhydric alcohol, alkylene oxide, and mixtures thereof; and is susceptible to free radical induced polymerization and copolymerizable ethylenically unsaturated compounds susceptible to free radical induced polymerization wherein said emulsion contains and is polymerized to thermoset form with the aid of at least one peroxy free radical generating catalyst compound, oil soluble cobalt salt of carboxylic acid promotor and at least about four coordination equivalents per mole of cobalt as metal of as least one amine compound promotor having at least one hydroxy alkyl group connected to the amino nitrogen and having the following formula:

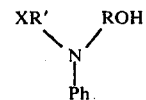

| Run No. | Catalyst Solution (%) | Cobalt Prep'n (%) | Wt. PDEA (%) | Wt. DMA (%) | Coordination Ratio Co: Amine | Gel Time (Min.) | Gel to Peak Exotherm (Min.) | Cure Time (Min.) | Peak Exotherm (°F) |
|---|---|---|---|---|---|---|---|---|---|
| 1 | 0.5 | 1.0 | 0.25 | — | 1:2 | 2.5 | 26.0 | 28.5 | 172 |
| 2 | " | " | — | 0.5 | " | 5.5 | 17.7 | 23.2 | 207 |
| 3 | 0.75 | " | 0.5 | — | 1:4 | 1.5 | 14.3 | 15.8 | 207 |
| 4 | " | " | — | 1.0 | " | 3.9 | 11.5 | 15.4 | 213 |
| 5 | 1.0 | " | 0.75 | — | 1:6 | 1.0 | 10.0 | 11.0 | 214 |
| 6 | " | " | — | 1.5 | " | 2.8 | 10.6 | 13.4 | 216 |
| 7 | 1.25 | " | 1.0 | — | 1:8 | 0.8 | 8.6 | 9.4 | 217 |
| 8 | " | " | — | 2.0 | " | 2.4 | 10.5 | 12.9 | 218 |
| 9 | 1.50 | " | — | 2.5 | 1:10 | 2.3 | 10.2 | 12.5 | 218 |
| 10 | 2.0 | " | 1.5 | — | 1:12 | 1.0 | 7.5 | 8.5 | 212 |
| 11 | " | " | — | 3.0 | " | 2.0 | 10.5 | 12.5 | 219 |
| 12 | " | " | 1.75 | — | 1:14 | 0.7 | 8.0 | 8.7 | 210 |
| 13 | " | " | — | 3.5 | " | 1.9 | 10.5 | 12.4 | 216 |
| 14 | " | " | 2.0 | — | 1:16 | 1.0 | 8.0 | 9.0 | 207 |
| 15 | " | " | — | 4.0 | " | 1.8 | 10.5 | 12.3 | 213 |

The gel time and gel to peak exotherm results of the foregoing runs were plotted and appear in the accompanying graph. Reference to the graph will show that when the amine of formula A is used at a coordination level of 1:2, its overall cure time (the sum of the gel time and gel to peak exotherm time) is significantly slower than that of DMA. However, at coordination levels of at least 4 and at least 5, respectively, cure times about equal to and better than those of DMA are obtained with the phenyl-substituted hydroxyalkyl substituted amines. It will be noted that the experimental work relative to DMA in the aforesaid copending application has been refined and extended and the superiorwherein X is a hydroxy group, R and R' are identical or different divalent saturated aliphatic hydrocarbon groups having 1–6 carbon atoms and Ph is phenyl; and the weight of said combination of amine, cobalt salt and peroxy catalyst is equal to about 0.25 to about 10% by weight, based on the polymerizable ingredients of the emulsion.

2. The method of claim 1 wherein said coordination ratio is about 1:6 to about 1:10.

3. The method of claim 1 wherein R and R' are identical or different divalent saturated aliphatic hydrocarbon groups having 1 to 4 carbon atoms.

4. The method of claim 1 wherein R and/or R' has two carbon atoms.

5. A method of curing polymerizable water-in-oil emulsions in which at least a major weight portion of the oil phase is one or more $\alpha,\beta$-ethylenically unsaturated polyester resin of a member selected from the group consisting of $\alpha,\beta$-ethylenically unsaturated polycarboxylic acid, anhydrides thereof, and mixtures thereof; and a member selected from the group consisting of polyhydric alcohol, alkylene oxide, and mixtures thereof; and is susceptible to free radical induced polymerization and copolymerizable ethylenically unsaturated compounds susceptible to free radical induced polymerization wherein said emulsion contains and is polymerized to thermoset form with the aid of at least one peroxy free radical generating catalyst compound, oil soluble cobalt salt of carboxylic acid promoter and at least about four coordination equivalents per mole of cobalt as metal of at least one amine compound promotor selected from the group consisting of phenyl-diethanol amine and m-tolyl-diethanol amine; and the weight of said combination of amine, cobalt salt and peroxy catalyst is equal to about 0.25 to about 10% by weight, based on the polymerizable ingredients of the emulsion.

6. The method of claim 1 wherein said cobalt salt is selected from the group of consisting of cobalt neodecanate, cobalt tallate, cobalt stearate, cobalt octoate, cobalt linoleate, and cobalt naphthenate.

7. The method of claim 1 wherein said cobalt promoter is selected from the group consisting of cobalt neodecanate and cobalt octoate.

8. The method of claim 1 wherein the peroxy catalyst is selected from the group consisting of hydrogen peroxide, methylethylketone peroxide, 2,4-pentane dione peroxide, combinations of 2,4-pentane dione peroxide and di-tert. butyl peroxide, cyclohexanone peroxide, polymeric ketone peroxides, lauroyl peroxide, cumene hydroperoxide, dicumyl peroxide, diethyl peroxide, di-tert.amyl peroxide, cyclohexyl hydroperoxide, and mixtures thereof.

9. The method of claim 1 wherein said peroxy catalyst is selected from the group of hydrogen peroxide, methylethylketone peroxide, and cyclohexyl peroxide.

10. The method of claim 1 wherein said ethylenically unsaturated polyester is an ethylenically unsaturated polyester of an $\alpha,\beta$-ethylenically unsaturated dicarboxylic acid or anhydride thereof, or mixtures thereof and a glycol.

11. The method of claim 10 wherein the mole ratio of said dicarboxylic acid to said glycol is from 10:8 to 8:10.

12. The method of claim 10 wherein said acid has from 3 to 36 carbon atoms.

13. The method of claim 10 wherein said acid has from 4 to 8 carbon atoms.

14. The method of claim 10 wherein said ethylenically unsaturated polyester is a polyester of an $\alpha,\beta$-ethylenically unsaturated dicarboxylic acid or anhydride thereof, and an acid selected from the group consisting of phthalic acid, isophthalic acid and terephthalic acid and glycol.

15. The method of claim 14 wherein said acid or anhydride thereof is selected from the group consisting of fumaric acid, maleic acid, itaconic acid, and their anhydrides.

16. The method of claim 10 wherein said acid or anhydride thereof is selected from the group consisting of fumaric acid, maleic acid, itaconic acid, and their anhydrides.

17. The method of claim 10 wherein said glycol is selected from the group consisting of ethylene glycol, diethylene glycol, 1,2-propylene glycol, 1,2-dipropylene glycol, 1,3-dipropylene glycol, 1,3-propylene glycol, 1,3-butylene glycol, 1,2-butylene glycol, neopentyl glycol, 1,3-pentane diol, and 1,5-pentane diol.

18. The method of claim 1 wherein the copolymerizable ethylenically unsaturated compound is selected from the group consisting of vinyl toluene, $\alpha$-methyl styrene, acrylonitrile, ethyl acrylate, methyl acrylate, methyl methacrylate, vinyl acetate, triallyl cyanurate, diallyl phthalate, methyl vinyl ether, and ethyl vinyl ether.

19. The method of claim 1 wherein the weight ratio of the copolymerizable ethylenically unsaturated compound to the unsaturated polyester is about 10:1 to about 1:10.

20. The method of claim 1 wherein the weight ratio of the copolymerizable ethylenically unsaturated compound to the unsaturated polyester is about 1:2 to about 2:1.

21. The method of claim 1 wherein the weight ratio of the aqueous phase to the oil phase is about 1:3 to 9:1.

22. The method of claim 1 wherein the weight ratio of the aqueous phase to oil phase is in the range of about 4:6 to about 7:3.

23. The method of claim 1 wherein at least a major portion of the oil phase of said emulsion is styrene and a polyester resin.

24. The method of claim 1 wherein the polyester resin has a mean weight average molecular weight in the range of about 1,000 to about 10,000 as determined by the acid and hydroxyl values of the reaction mixture employed to prepare the polyester.

* * * * *